(12) United States Patent
Valinejadshoubi et al.

(10) Patent No.: US 9,896,875 B2
(45) Date of Patent: Feb. 20, 2018

(54) ADAPTIVE VENTILATING WINDOW FOR DIFFERENT WEATHER CONDITIONS

(71) Applicants: Masoud Valinejadshoubi, Mazandaran (IR); Alireza Bozorgi, Tehran (IR); Saeideh Bagheri rad, Tehran (IR)

(72) Inventors: Masoud Valinejadshoubi, Mazandaran (IR); Alireza Bozorgi, Tehran (IR); Saeideh Bagheri rad, Tehran (IR)

(*) Notice: Subject to any disclaimer, the term of this patent is extended or adjusted under 35 U.S.C. 154(b) by 0 days.

(21) Appl. No.: 15/197,204

(22) Filed: Jun. 29, 2016

(65) Prior Publication Data

US 2016/0340959 A1 Nov. 24, 2016

(51) Int. Cl.
| | |
|---|---|
| *E05F 15/71* | (2015.01) |
| *E04F 10/10* | (2006.01) |
| *E05F 15/611* | (2015.01) |
| *E04F 10/00* | (2006.01) |
| *H02S 20/26* | (2014.01) |
| *H02S 20/30* | (2014.01) |
| *F24F 11/00* | (2018.01) |
| *H04L 12/28* | (2006.01) |

(52) U.S. Cl.
CPC ............ *E05F 15/71* (2015.01); *E04F 10/005* (2013.01); *E04F 10/10* (2013.01); *E05F 15/611* (2015.01); *F24F 11/00* (2013.01); *H02S 20/26* (2014.12); *H02S 20/30* (2014.12); *H04L 12/2803* (2013.01); *E05Y 2400/32* (2013.01); *E05Y 2400/42* (2013.01); *E05Y 2400/44* (2013.01); *E05Y 2400/61* (2013.01); *E05Y 2400/628* (2013.01); *E05Y 2400/66* (2013.01); *E05Y 2900/148* (2013.01); *G05B 2219/00* (2013.01); *Y02B 10/10* (2013.01)

(58) Field of Classification Search
CPC ...... E05F 15/71; E05F 15/70; H04L 12/2803; F24F 11/00; E04F 10/10; H02S 20/30; H02S 20/26; G05B 2219/00; E05Y 2400/628; E05Y 2400/66; E05Y 2400/44; E05Y 2400/32; E05Y 2400/42; E05Y 2400/61; E05Y 2900/148
See application file for complete search history.

(56) References Cited

U.S. PATENT DOCUMENTS

| | | | |
|---|---|---|---|
| 1,344,561 A | 6/1920 | Poehner | |
| 5,006,766 A * | 4/1991 | Yuhas | E05F 15/71 318/53 |
| 5,225,748 A * | 7/1993 | Haring | E06B 9/32 160/1 |

(Continued)

FOREIGN PATENT DOCUMENTS

DE 102005006010 A1 8/2006

*Primary Examiner* — Justin Rephann
(74) *Attorney, Agent, or Firm* — NovoTechIP International PLLC

(57) ABSTRACT

A window frame supports a central panel, with two adjacent pivoting side panels. The pivoting side panel includes two frames coupled by a hinge. Two side panel pivot actuators couple to the pivoting side panels. Movable awnings support photovoltaic modules to provide a power source. An awning open-close actuator couples to the movable awnings. Indoor and outdoor sensors send measurements to the controller that, based on the measurements, selectively operates the awning open-close actuator and the side panel pivot actuators.

19 Claims, 15 Drawing Sheets

(56) References Cited

U.S. PATENT DOCUMENTS

| | | | | |
|---|---|---|---|---|
| 5,449,987 | A | * | 9/1995 | McMillan ............... E05F 15/71 318/266 |
| 5,864,989 | A | | 2/1999 | Funatsu et al. |
| 6,646,196 | B2 | | 11/2003 | Fronek et al. |
| 7,032,348 | B1 | * | 4/2006 | Epps ....................... E05F 15/74 49/25 |
| 2001/0027846 | A1 | * | 10/2001 | Osinga ................ E04F 10/0659 160/70 |
| 2003/0172591 | A1 | * | 9/2003 | Labarre .................. E05F 15/63 49/248 |
| 2005/0034374 | A1 | * | 2/2005 | Ebbe .................. G07C 9/00309 49/325 |
| 2010/0037526 | A1 | | 2/2010 | Ohishi |
| 2011/0303369 | A1 | * | 12/2011 | Fehn .................. E04F 10/0659 160/66 |
| 2012/0144743 | A1 | * | 6/2012 | Piney ................... E04F 10/005 49/29 |
| 2012/0298315 | A1 | * | 11/2012 | Marquez ............. E04F 10/0618 160/1 |

* cited by examiner

| Num. | Wind Speed (m/s) | Wind angle (degree) | Angle of outer frame in first side panel (degree) | Angle of outer frame in second side panel (degree) | Airflow rate (kg/s) |
|---|---|---|---|---|---|
| 1 | 1 | 0 | 15 | 20 | 0.028 |
| 2 | 3 | 0 | 15 | 20 | 0.079 |
| 3 | 5 | 0 | 15 | 20 | 0.132 |
| 4 | 1 | 45 | 15 | 20 | 0.045 |
| 5 | 3 | 45 | 15 | 20 | 0.134 |
| 6 | 5 | 45 | 15 | 20 | 0.224 |
| 7 | 1 | 90 | 15 | 20 | 0.001 |
| 8 | 3 | 90 | 15 | 20 | 0.002 |
| 9 | 5 | 90 | 15 | 20 | 0.004 |
| 10 | 1 | 90 | 15 | 60 | 0.006 |
| 11 | 3 | 90 | 15 | 60 | 0.012 |
| 12 | 5 | 90 | 15 | 60 | 0.019 |
| 13 | 1 | 90 | 20 | 45 | 0.003 |
| 14 | 3 | 90 | 20 | 45 | 0.01 |
| 15 | 5 | 90 | 20 | 45 | 0.016 |

FIG.16

ADAPTIVE VENTILATING WINDOW FOR DIFFERENT WEATHER CONDITIONS

CROSS REFERENCE TO RELATED APPLICATION

This application claims the benefit of priority to an Iran patent application having serial number 139450140003003815 filed on Jun. 29, 2015, which is incorporated by reference herein in its entirety.

TECHNICAL FIELD

The present implementation relates generally to window structures and more particularly to window structures comprising a photovoltaic panel.

BACKGROUND

Photovoltaic (PV) modules are formed of a plurality of PV cells, connected in a circuit (either series or parallel) configured for charging batteries, or directly powering certain low power devices, or both. PV modules are commercially available from various vendors, in a wide range of sizes and power outputs. One known type of PV module is configured as panel that can be roof-mounted, or can be part of a building structure as Building Integrated Photovoltaic (BIPV). However, PV modules or panels have not been incorporated into a multi-paneled window to provide electrical energy for functional, educational or other purposes.

Accordingly, there is a need in the art for a window structure with a photovoltaic module incorporated therein and more specifically, there is a need for a multi-paneled window structure in which at least one such panel is comprised of a photovoltaic panel and at least one other panel is comprised of vision glass.

SUMMARY

This Summary identifies features and aspects of some example aspects, and is not an exclusive or exhaustive description of the disclosed subject matter. Whether features or aspects are included in, or omitted from this Summary is not intended as indicative of relative importance of such features. Additional features and aspects are described, and will become apparent to persons skilled in the art upon reading the following detailed description and viewing the drawings that form a part thereof.

Disclosed apparatuses include an adaptive ventilating window apparatus that can include a window frame, configured for installation in a through opening in an exterior wall of a building, and a window, including a center panel and side pivoting panel supported by the window frame. The side pivoting panel can be movable between an open position and a closed position at any desired angle, and can include an inner frame and an outer frame movably coupled by a hinge, wherein the inner frame faces an interior space of the building and the outer frame faces the exterior of the building. Disclosed implementations of the adaptive ventilating window can include a first actuator, coupled to a controller and to the side pivoting panel, a movable awning, movable between an awning open position and an awning closed position, the closed position at least partially covering the window, and a second actuator, coupled to the movable awning and to the controller. Disclosed implementations of the adaptive ventilating window can also include a sensor, configured to measure an inside environmental condition in the interior space of the building, and an outside environmental condition. Disclosed implementations of the adaptive ventilating window can include the controller being coupled to a source power, and to the sensor, the first actuator and the second actuator and, based at least in part on the measurement of the environmental condition, to control the first actuator to rotate the side pivoting panel, or the second actuator to urge the movable awning to a position between the open position and the closed position, or both.

Disclosed implementations of the adaptive ventilating window can include, according to an aspect, the first actuator being further configured to urge, in response to the controller, hinged movement of the inner frame independent from movement of the outer frame. In example implementations, the first actuator can be further configured to urge, in response to the controller, the outer frame from a closed position to an open position, and concurrently, urge the inner frame to a position approximately 90 degrees to the window frame. In one aspect, the first actuator can be further configured to urge, in response to the controller, the outer frame from an open position to the closed position.

Disclosed aspects include the actuator being further configured to urge, in response to the controller, the inner frame to a position at which an angle of the inner frame relative to the window frame is other than 90 degrees, concurrent with the outer frame being in the open position.

According to one or more disclosed aspects, the side pivoting panel can be a first side pivoting panel, the inner frame can be a first inner frame, the outer frame is a first outer frame, and the hinge can be a first hinge. In a related aspect, the adaptive ventilating window apparatus can further include a second side pivoting panel, the second side pivoting panel being movable between an open position and a closed position at any desired angle. In addition, disclosed aspects of the second side pivoting panel can include a second inner frame and a second outer frame movably coupled by a second hinge, in which the second inner frame faces an interior space of the building and the second outer frame faces the exterior of the building. According to one or more disclosed aspects, an example adaptive ventilating window can include a third actuator, coupled to the controller and configured to urge the second side pivoting panel in response to the controller. In an aspect, the first actuator can be further configured to urge hinged movement of the first inner frame, in response to the controller, independent from movement of the first outer frame. In addition, according to as aspect, the third actuator can be further configured to urge hinged movement of the second inner frame, in response to the controller, independent from movement of the second outer frame.

In one disclosed example, the first actuator can be further configured to urge, in response to the controller, the first outer frame from an open position to the closed position and, concurrently, urge the first inner frame to a position folded against and parallel to the first outer frame. Examples can further include the third actuator being further configured to urge, concurrent with the first outer frame being in the closed position and first inner frame folded against and parallel to the first outer frame, in response to controller, the second outer frame from a closed position to an open position, and concurrently, urge the second inner frame to a position approximately 90 degrees to the window frame. Furthermore, the angle of the first outer frame, the second outer frame, the first inner frame and the second inner frame can be adjusted independently between 0 and 90-degree respect to the main panel.

In one aspect of the present application, the controller is configured to operate remotely, e.g.; via Bluetooth, wireless communication, etc. or through the keypad installed on the controller. In another aspect the controller can be turned off and the adaptive ventilating window panel and its components can operate manually.

According to one or more disclosed aspects, an example adaptive ventilating window apparatus can also include an ultra-violet (UV) index sensor, coupled to the controller, and configured to measure a UV index exterior to the building. In an aspect, the controller can be further configured to compare the UV index measurement to a UV threshold and, upon the UV index measurement exceeding the UV threshold, to control the second actuator to urge the movable awning from an open position to the closed position.

According to one or more disclosed aspects, an example of adaptive ventilating window apparatus can also include a power storage, and a photovoltaic (PV) power converter having a PV panel supported by the movable awning. In one implementation, the PV power converter can be configured to receive and convert a solar energy to a charging current and to provide the charging current to the power storage, wherein the power storage provides at least a portion of the source power.

According to one or more disclosed aspects, a sensor can be configured to measure an inside temperature and an outside temperature. In a related aspect, the controller can be further configured to control the side pivoting panel(s) based, at least in part, on comparing the inside temperature with a predetermined threshold.

According to one or more disclosed aspects, a sensor can be configured to measure wind speed and direction outside the building. In a related aspect, the controller can be further configured to control the side pivoting panel(s) based, at least in part, on measuring wind speed and direction outside the building.

In an aspect the center panel can be a pivoting center panel, configured to rotate between a center panel open position and a center panel closed position. It should be noted that the pivoting center panel can open by rotation around a vertical or horizontal direction. Furthermore, the pivoting center panel can be in any shape.

BRIEF DESCRIPTION OF THE DRAWINGS

Features of the subject technology are set forth in the appended claims. However, for purpose of explanation, several implementations of the subject technology are set forth in the following figures.

FIG. 16 illustrates contour of the velocity of the air versus the angles of the pivotally coupled frames.

DETAILED DESCRIPTION

Figure 1A:
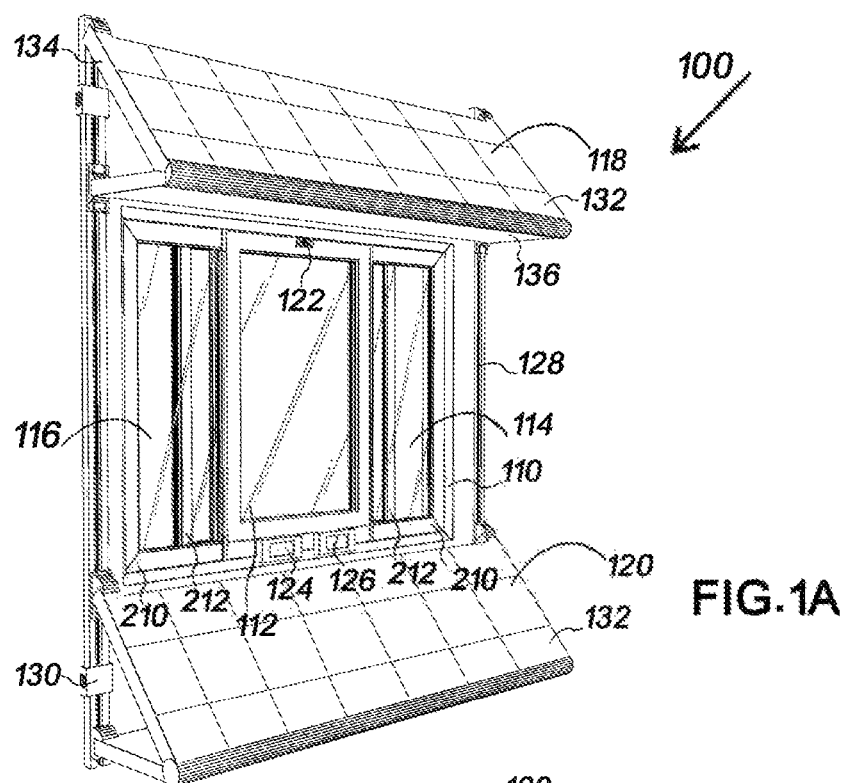
FIGS. 1A-1C illustrate an adaptive ventilation pivoting window, according to one example implementation of the instant application.

In the following detailed description, various examples are presented to provide a thorough understanding of inventive concepts, and various aspects thereof that are set forth by this disclosure. It may become apparent to persons of skilled, upon reading the present disclosure, that various inventive concepts and aspects therefore may be practiced without one or more details shown in the examples. In other instances, well known methods, procedures, components, and/or circuitry have been described at a relatively high-level, without detail, to avoid obfuscation of inventive.

The term "vertical" as used in this description can be an arbitrary direction, and "horizontal" can be a direction normal to vertical, where the vertical and horizontal directions form a plane parallel with the wall in which the adaptive ventilating window is installed. Examples illustrated in the figures align the vertical direction as an up-down direction parallel to gravity. It will be understood that this definition is not a limitation on the scope of disclosed concepts. For example, there can be implementations where structures described as movable in the vertical and horizontal directions can be re-oriented to be movable in the horizontal and vertical directions, respectively. It should be noted that the hinges can be installed at any angle between vertical and horizontal position.

As used in this description, "building" encompasses dwelling, office building, school, or other structure to be ventilated.

The term "actuator," as used in this description encompasses actuator system(s). For example, in implementations illustrated in the figures as a single actuator performing certain described functions, the single graphical item described as the actuator can be one physical actuator, or a system of physical actuators. In addition, the single graphical item described as the actuator may include one mechanical coupling, or a plurality of mechanical couplings to the described actuated structure(s).

One example adaptive ventilating window can include a window frame that cooperates with an opening in a wall of a dwelling, office building, school, or other structure to be ventilated. Supported in the window frame can be a central panel and a side pivoting panel. The side pivoting panel may be one of a plurality of side two-piece pivoting panels.

In an aspect, the side pivoting panel(s) can include an outer frame and an inner frame, connected together by a vertical hinge. In one implementation, the vertical hinge is supported, and is configured relative to the window frame, and relative to the inner frame and outer frame. "Inner frame" and "outer frame" are used because, over an operative range of motions and positions, the inner frame extends into an interior of the building, and the outer frame extends into an outside environment.

In an aspect, the adaptive ventilating window can include a side panel pivot actuator, which may also be referenced as a "first actuator," coupled to the side pivoting panel.

It should be noted that, the side pivoting panels 114 and 116 could work independently, which means they can be in open positions with the same or different opening angles.

In an aspect, the adaptive ventilating window can include a movable awning, movable between an open position and a closed position, the closed position at least partially covering the window. The adaptive ventilation window can include an awning actuator, which may also be referred to as a "second actuator". The second actuator can be configured to selectively, in response to an awning command, urge a movement of the movable awning between the open position and the closed position, and to points between. In an aspect, the movable awning can include an upper awning and a lower awning, and the second electric actuator can be further configured to move one or both of the upper awning and lower awning independent of the other. In one implementation, functions of generating the awning command controller may be included in the same controller that generates the side panel pivot command.

In some implementations, outer surfaces of the upper awning, the lower awning, or both, can support photovoltaic (PV) modules. The PV modules can each include a plurality of photovoltaic cells, each configured to convert sunlight energy into an electric current. The PV modules can be implemented, for example, using commercially devices available from various vendors, in a wide range of sizes and power outputs. The PV modules can be connected in a circuit (either series or parallel) for battery charging or other applications.

In an aspect, the adaptive ventilation window can include a set of environment sensors that interface to a controller configured to automatically control, based at least in part on data from the sensors, the above-described side pivoting panel (or panels), or the movable awnings, or both. The automatic control of the side pivoting panels is provided by a combination of the controller, the sensors, and the side panel pivot actuators. The combination can be referred to as an "automatic panel rotating mechanism." The environment sensors can include an inside thermometer, outside thermometer, outside wind sensor and outside UV sensor. The sensors can include some sensor means for detecting temperature inside and outside the structure, speed and direction of wind outside the structure and UV index outside the structure to be ventilated.

In an aspect, the controller can be configured to detect when the temperature inside the structure to be ventilated is higher than a predetermined threshold. The controller, in response can control an actuator to urge one or more of the side pivoting panels to a position, based on the required air flow rate for ventilation process and wind condition outside the structure. In an aspect, the controller can be further configured to detect, based on UV sensors, when the UV index is higher than a predetermined threshold and, in response, control an actuator to close the movable awnings.

Figures 1B, 1C:
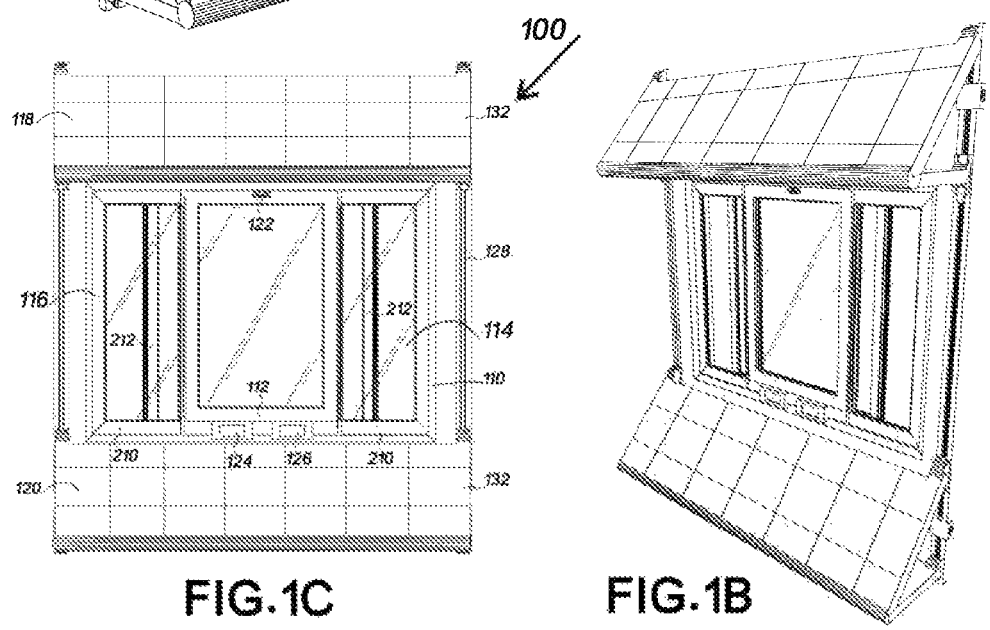

FIGS. 1A-1C illustrate an example of adaptive ventilation window 100 in accordance with one or more aspects. FIG. 1A illustrates a view of the controllable ventilation window 100 from a left viewing angle. FIGS. 1B and 1C illustrate perspective views of the adaptive ventilation window 100 from a right viewing angle, and from a normal projection. It will be understood that "left" and "right" mean projection lines having angles to the left and right, respectively, from the projection line of the FIG. 1C view.

Referring to FIG. 1A, the adaptive ventilation window 100 can have interior structure facing an interior of a building and exterior structure facing an outward environment. The adaptive ventilation window 100 can include a window frame 110 and, supported in the window frame 110, a central panel 112, a first side pivoting panel 114, and a second side pivoting panel 116. The first side pivoting panel 114 and the second side pivoting panel 116 will be collectively referenced as "the side pivoting panels 114 and 116."

The adaptive ventilation window 100 can include a first movable awning 118, and a second movable awning 120. The first movable awning 118 can be alternatively referenced as a "movable upper awning 118," and the second movable awning 120 can be alternatively referenced as a "movable lower awning 120." The first movable awning 118 and the second movable awning will be collectively referenced as "the movable awnings 118 and 120".

Referring to FIG. 1A, the adaptive ventilation window 100 can include a first sensor 122, a second sensor 124, and a third sensor 126. In an aspect, the adaptive ventilation window 100 can also include a vertical fixed rail 128, a controller-commanded motor 130, photovoltaic modules 132, insulating layers 134, metal layer 136 and a controller 302.

The window frame 110 can be configured to cooperate with a through opening (not explicitly visible in the figures) in a wall of the building to be ventilated. In one implementation, the window frame 110 can be a rectangular shape. However, other shapes are contemplated. For example, the window frame 110 may be a square shape, an oval shape or other shapes.

Referring to FIGS. 1A-1C, a central framed panel 112 can be supported by the window frame 110. In an aspect, the central framed panel 112 can be a movable central framed panel 112 a single-frame panel configured to move between an open and a closed position and is comprised of vision glass. However, other panels can be used. For example, two-frame panel, side framed panel or other panels.

The side pivoting panels 114 and 116 are located on both sides of the central framed panel 112. The side pivoting panels 114 and 116 are configured to move between an open position and a closed position at any desired angle. As shown on FIG. 2, each of the side pivoting panels 114 and 116 can include an inner frame 212 and an outer frame 210. The frames are pivotally coupled to each other by a vertical hinge (not explicitly visible in the figures). The inner frame 212 faces and can extend into an interior of the structure to be ventilated. The outer frame 210 faces and projects outward toward an external environment of the building. The inner frame 212 and outer frame 210 can be moved, for example, by an actuator (not explicitly visible in the figures) coupled to the controller. For purposes of description, the actuator can be termed a "first actuator."

As shown on FIG. 1A each of the movable upper awning 118 and movable lower awning 120 can be mechanically coupled to the exterior of the window frame 110, one above the window and one below the window. The movable awnings 118 and 120 move between an open position and a closed position to control the amount of light entering the interior of the structure to be ventilated. The movable awnings 118 and 120 move to open and closed positions through fixed rails 128 by a controller-commanded motor 130. An outer surface of one or both of the movable awnings 118 and 120 can support photovoltaic (PV) modules 132 for absorbing photovoltaic energy and act as a power source for the controller 302 (shown in FIG. 3A). The photovoltaic module includes a plurality of PV cells. PV cells convert sunlight energy into direct electric current. PV cells are electrically connected to one another in series to provide a PV module, although they can also be connected in parallel for some applications. PV modules are commercially available from manufacturers in various standard sizes and power outputs. To be functional in accordance with the present application, the PV module 132 and its PV cells are located on the exterior or outer side of the awning so that the cells are exposed to full sunlight when available. The back side of the movable awnings 118 and 120 can be made of insulation layers 134 to minimize the heat flow between the interior and exterior of the building. The movable awnings can move in accordance with the movement of the sun to maximize the sunlight received by the solar panel.

The first sensor 122 can include a wind speed sensor configured to sense the speed and direction of wind outside of the structure. The second sensor 124 can include a temperature sensor configured to sense the temperature inside and/or outside of the structure. The controller 302 is configured to receive the measured speed and direction of wind from wind speed sensor 122, the temperature from the temperature sensor 124, or the UV index from the sunlight sensor 126 on the interior and exterior of the structure. The controller can be configured and issue a command for opening side pivoting panels 114 and 116 when the temperature on the interior of the structure is found to be higher than a predetermined threshold. Further, the controller can be configured to control the controller-commanded motor 130, for example, to close the movable awnings 118/120 when the UV index is higher than a predetermined value. Further, the controller can be configured to control the angle of inner frames 212 and outer frames 210 in accordance to the inside temperature, outside temperature, wind speed, the direction of the wind and desired ventilation. Further, the controller may be configured to control the movable awnings and the pivoting panels remotely or manually in accordance to the user command.

Figure 2:
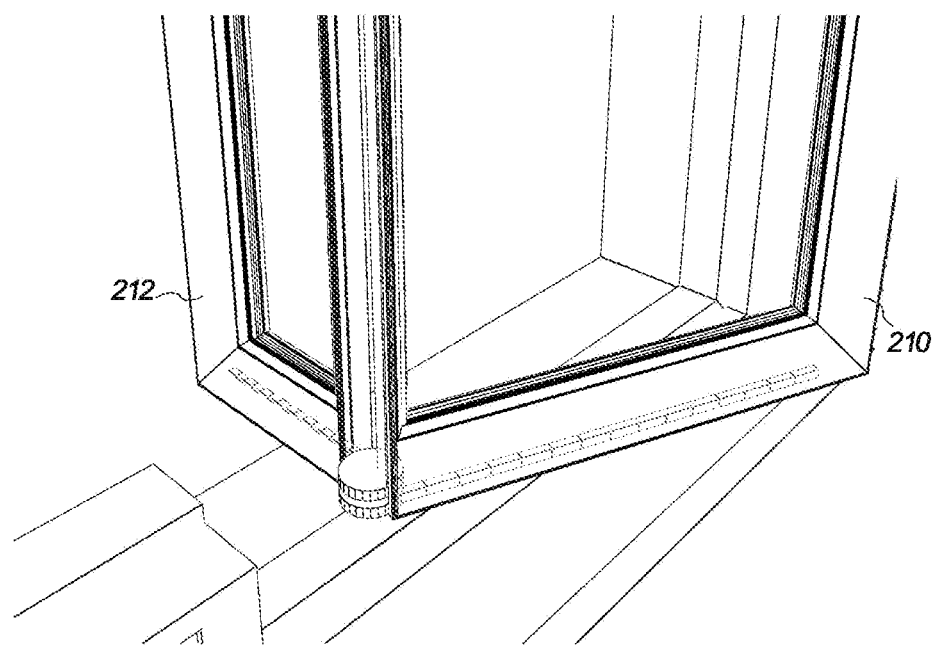
FIG. 2 illustrates the pivotally coupled frames of the side panels, according to an implementation.

FIG. 2 illustrates the pivotally coupled inner frames 212 and outer frame 210 of the first side pivoting panel 114, according to one implementation. The inner frame 212 and outer frame 210 are shown in open positions. The outer frame 210 can open at angles between 0 to 90 degrees, and the inner frame 212 can open at angles between 0 to 90 degrees.

Figure 3A:
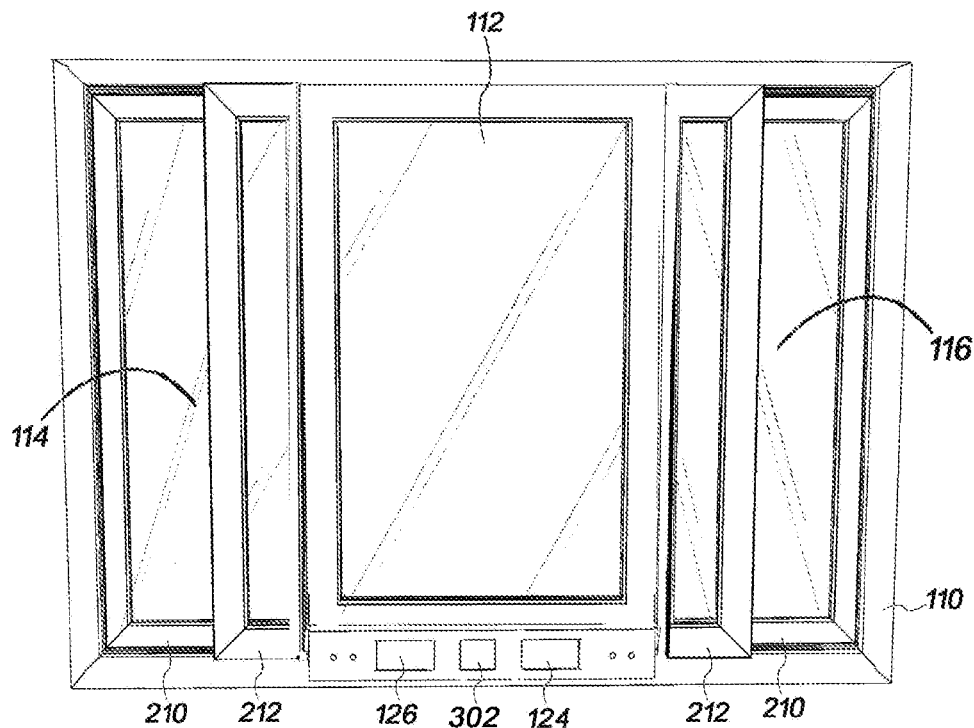
FIGS. 3A-3B are illustrates the interior view of the structure to be ventilated, the central frame and side frames are in closed positions.
Figure 3B:
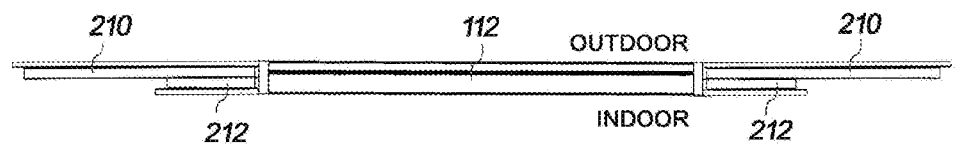

FIGS. 3A and 3B illustrate the interior view of the building to be ventilated, when the central frame 112 and side pivoting panels 114 and 116 are in closed positions.

Figure 6A:
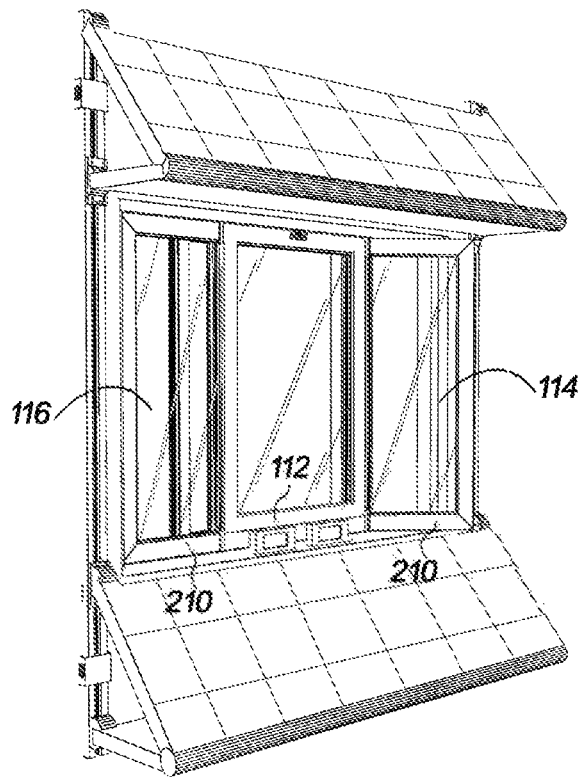
FIGS. 6A-6C are the adaptive ventilation pivoting window with one pivotally coupled frame in open position and the other in closed position.
Figure 6C:
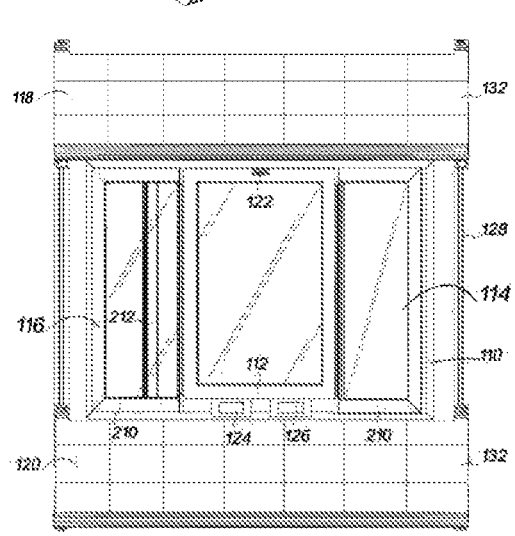
Figure 6B:
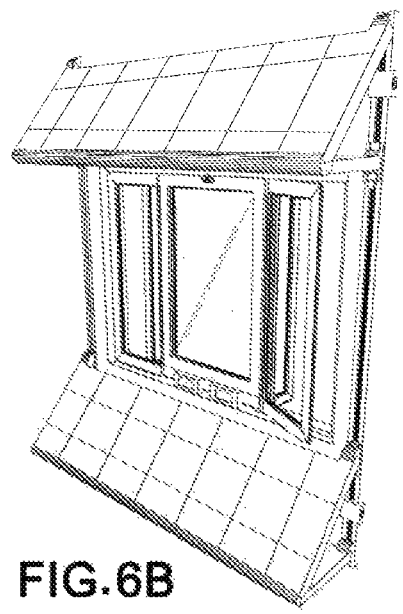

Reference is next made to FIGS. 4-7 showing the adaptive ventilation window with the first side pivoting panel 114 being in open positions and the second side pivoting panel 116 either in open position (FIGS. 4 and 5) or in closed position (FIGS. 6 and 7). The outer frames 210 of the side pivoting panels 114 and 116 can be configured such that, in the open position, they control the air inflow. The inner frames 212 can be configured so that, in the open position, they can provide controllable distribution of the airflow inside the structure. The inner frames 212 can also prevent the air from a quick exit upon entering the structure to be ventilated. In an aspect, the side pivoting panels 114 and 116 can be operated independently, which means they can be in open positions with the same or different opening angles.

In an aspect, an actuator coupled to the controller and the first side pivoting panel 114 can be termed a "first actuator," and an actuator coupled to the controller and to the movable awnings 118 and 120 can be termed a "second actuator." The controller-commanded motor 130, for example, can be an implementation of the second actuator. In addition an actuator coupled to the controller and the second side pivoting panel 116 can be termed a "third actuator." For purposes of description, the inner frame 212 of the first pivoting side panel 114 can be termed a "first inner frame 212," and the inner frame 212 of the second pivoting side panel 116 can be termed a "second inner frame 212." Also for description, the outer frame 210 of the first pivoting side panel 114 can be termed a "first outer frame 210," and the outer frame 210 of the second pivoting side panel 116 can be termed a "second outer frame 210."

Figure 7A:
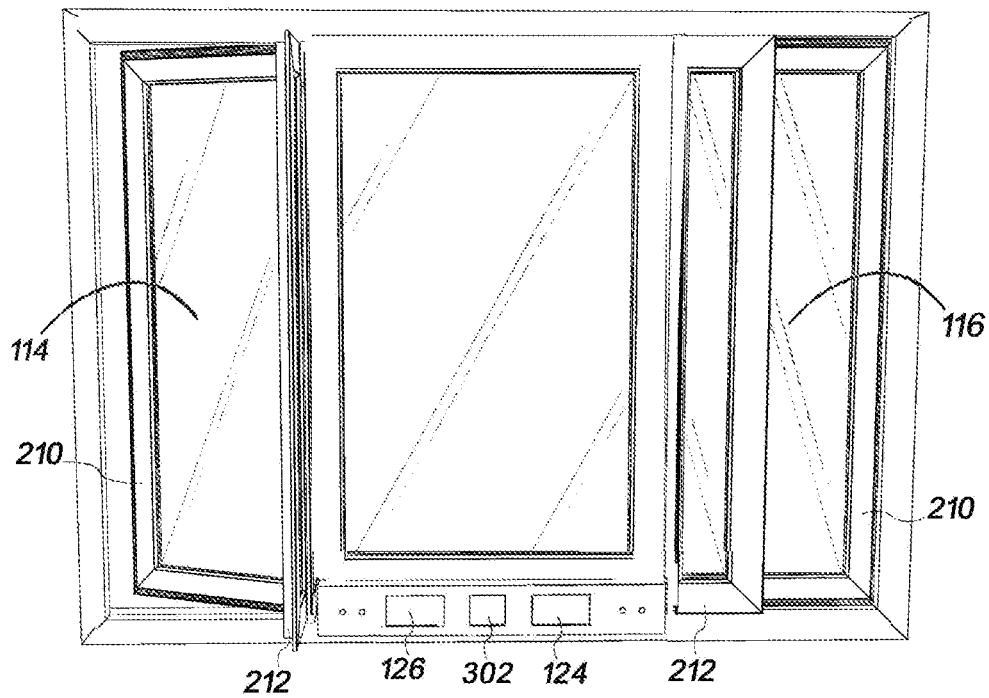
FIGS. 7A and 7B illustrate the ventilation process whit one pivotally coupled frame in open position and the other one in closed position.
Figure 7B:
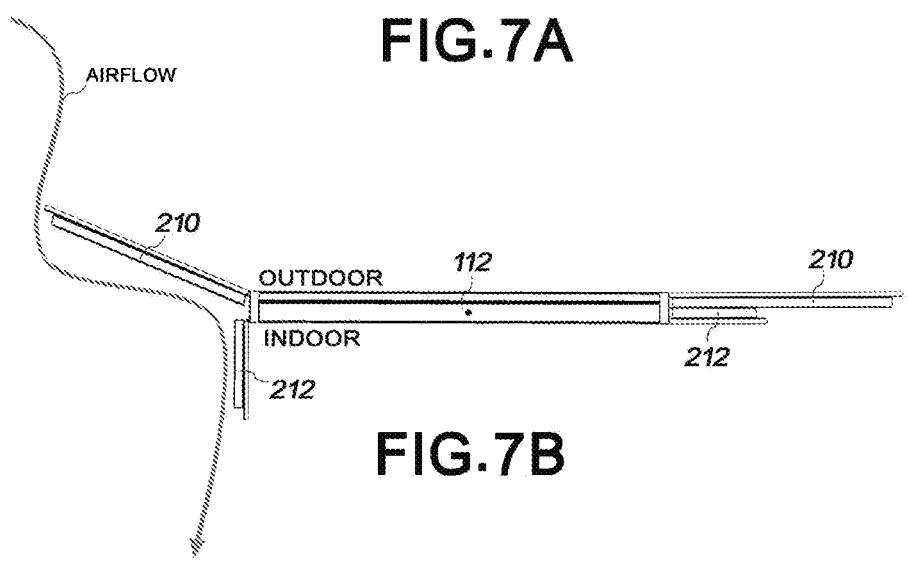
Figure 8A:
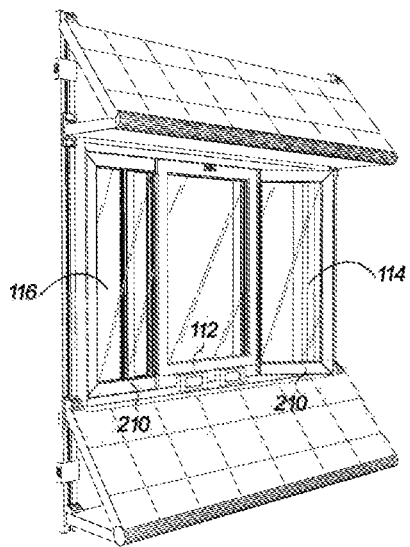
FIGS. 8A-8C illustrate the adaptive ventilation pivoting window with moving awnings in open and closed positions.
Figure 8B:
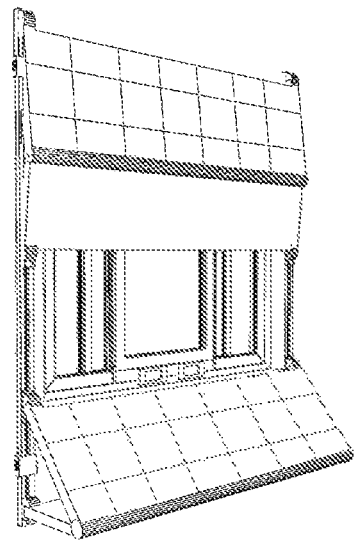
Figure 8C:
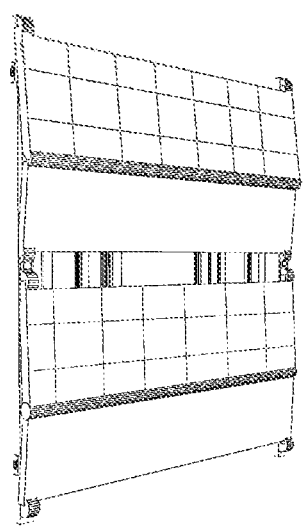
Figure 9:
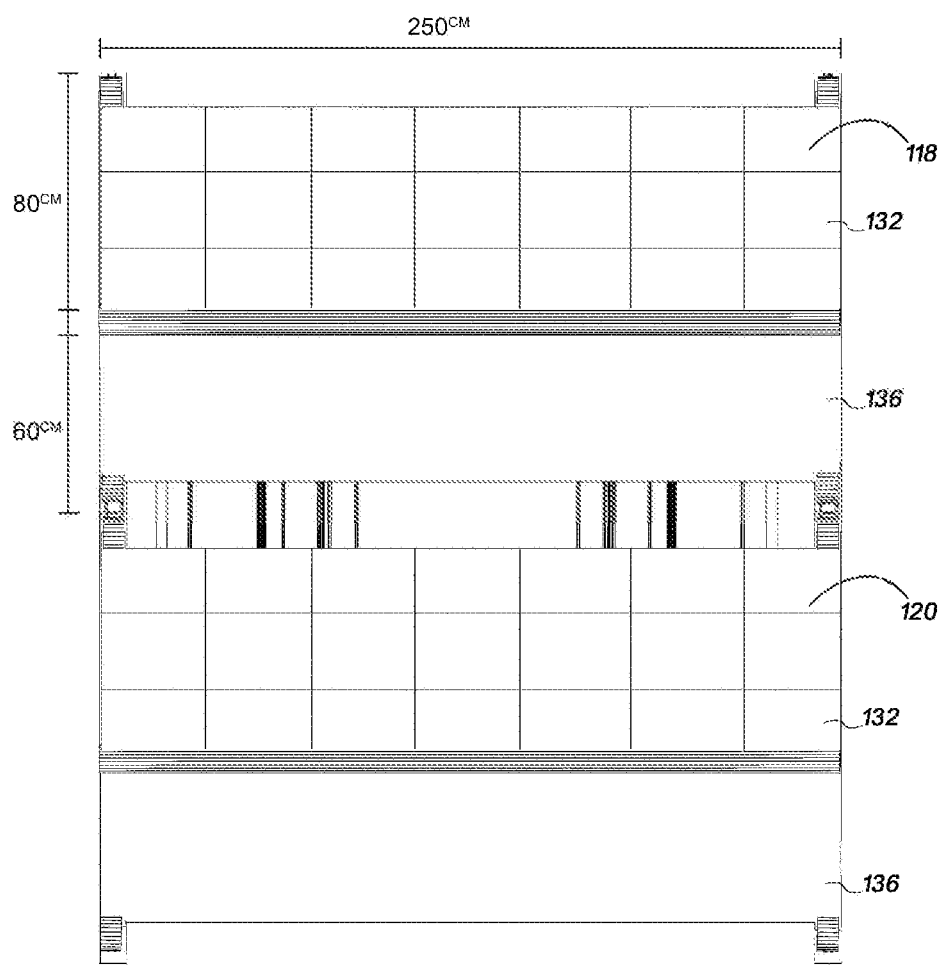
FIG. 9 is an explanatory plan view of the adaptive ventilation pivoting window with the awnings is closed.

Referring to FIGS. 7A and 7B, as illustrated, the first actuator can be configured to urge, in response to the controller, the first outer frame 210 from an open position to the closed position and, concurrently, urge the first inner frame 212 to a position folded against and parallel to the first outer frame 210. In combination, the third actuator can be further configured to urge the second outer frame 210, concurrent with the first outer frame 210 being in the closed position and the first inner frame 212 being folded against and parallel to the first outer frame 210, from a closed position to an open position, and concurrently, urge the second inner frame 212 to a position approximately 90 degrees to the window frame 110.

Figure 4A:
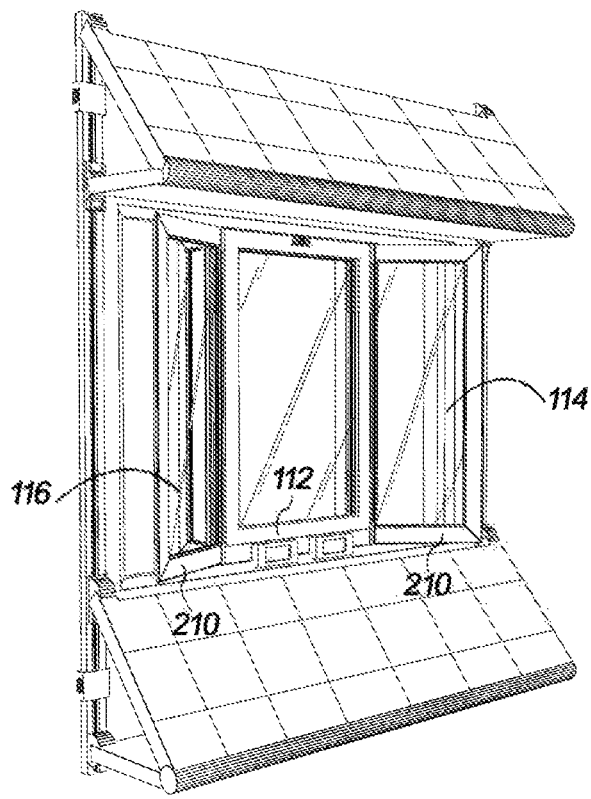
FIGS. 4A-4C are the adaptive ventilation pivoting window with the pivotally coupled frames are in open positions.
Figure 4C:
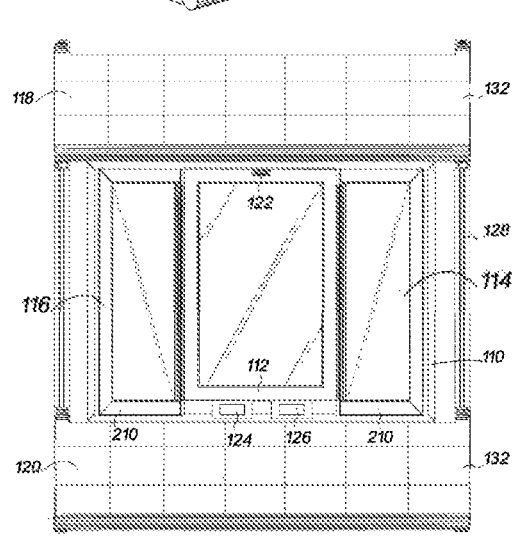
Figure 4B:
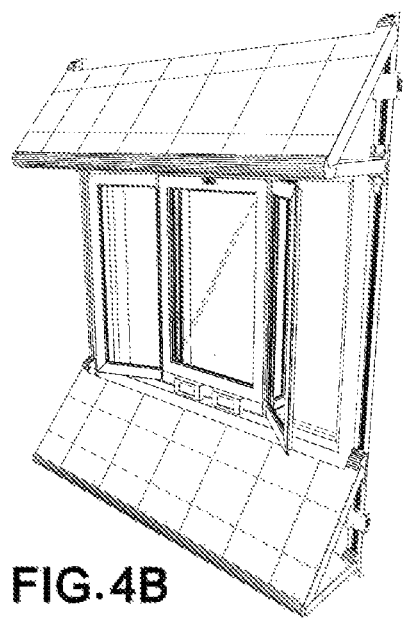
Figure 5A:
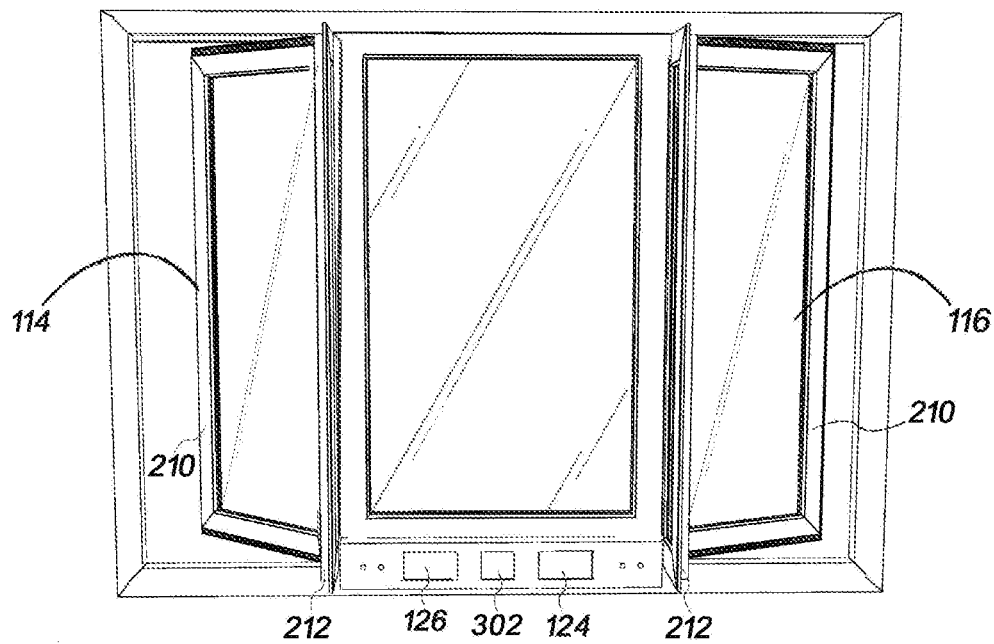
FIGS. 5A and 5B illustrate the ventilation process when the pivotally coupled frames are in open positions.
Figure 5B:
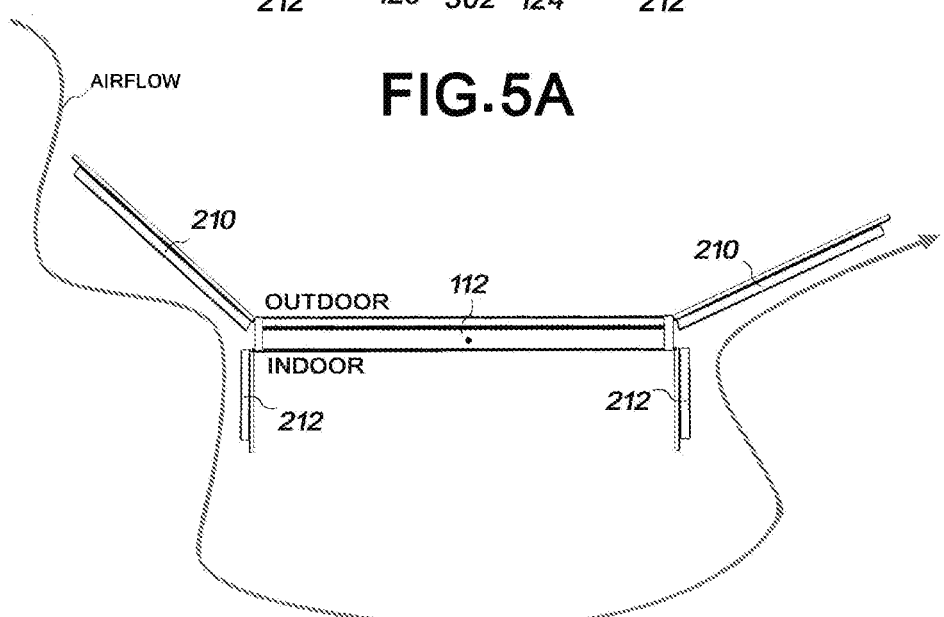

As seen on FIGS. 4, and 6, the movable upper awning 118 is above the window frame 110 and the movable lower awning 120 is below the window frame 110. One function of the movable awnings 118 and 120 is to prevent, or restrict, in warm weather, sunlight heat from entering through the window frame 110. Additional functions of the movable awnings 118/120 can include providing additional insulation in cold weather, and protecting the window frame 110, and the interior of the building, from severe weather conditions.

The movable awnings 118 and 120 can move via fixed rail 128 by a controller-commanded motor 130. The inner surface of the movable awnings 118 and 120 is made of aluminum and the middle-section is made of insulating materials to further decrease the heat flow and hence heat dissipation through the window frame 110 while the movable awnings 118 and 120 are in closed positions.

FIGS. 8A-8C and 9 show another implementation where the outer surface of the movable awnings 118 and 120 is covered with Photovoltaic (PV) modules 132. The PV module 132 consists of a plurality of PV cells to convert sunlight energy into direct electric current. The PV cells are commercially available from many manufacturers in various sizes and power outputs. The PV cells can be connected in a circuit (either series or parallel) for battery charging or other applications. The PV cells may provide absorbing photovoltaic energy and storing it in the power storage for powering the controller. In the shown example, each PV module includes 83 PV cells and each awning has an outer surface 118 80 cm high and inner surface 136, aluminum, 60 cm high. The window frame 110 is 2.5 m long. The controller 302 receives, from wind speed sensor 122 and temperature sensor 124, the temperature inside and speed and direction of wind outside the structure to be ventilated. In an aspect, the controller 302 can issue a command to a motor (not shown) for opening or closing the side pivoting panels based on comparing the inside temperature with a predetermined threshold. In another aspect, the controller 302 can receive, from sunlight sensor 126, the UV index outside the structure to be ventilated. The controller can be configured to issue a command to the motor 130 for opening or closing the moving awnings 118 and 120, based on comparing the UV index outside the structure to be ventilated and a predetermined threshold.

Figure 10:
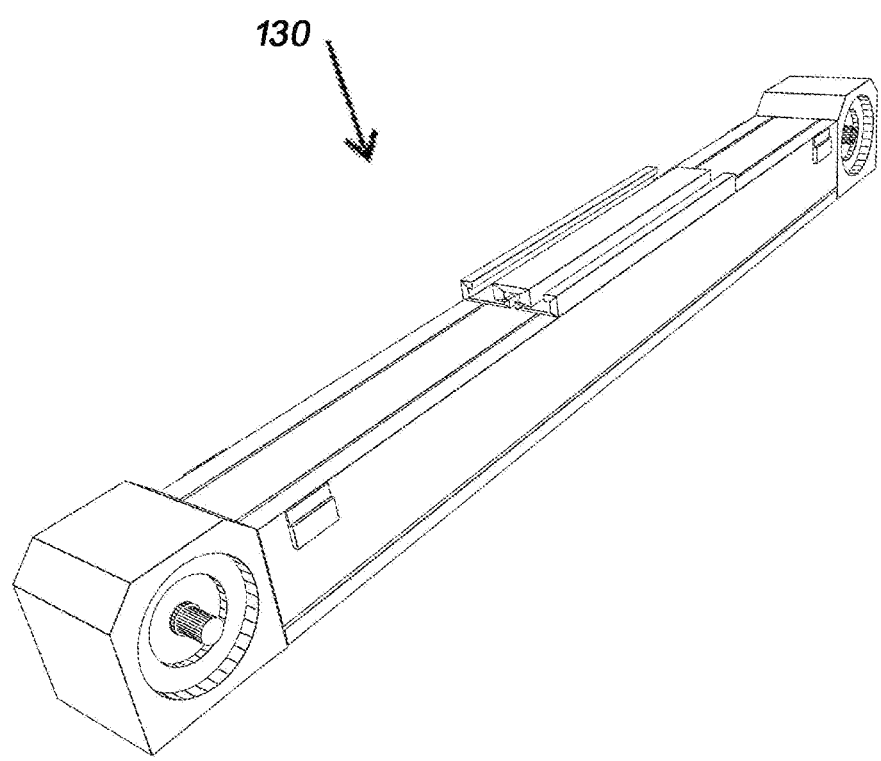
FIG. 10 illustrates an example of the fixed rail and the motor for moving the awnings.
Figure 11A:
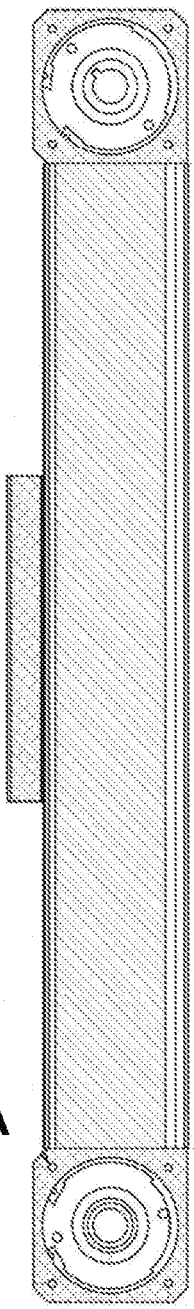
FIGS. 11A and 11B are explanatory plan of an example of the fixed rail and the motor for moving the awnings.
Figure 11B:
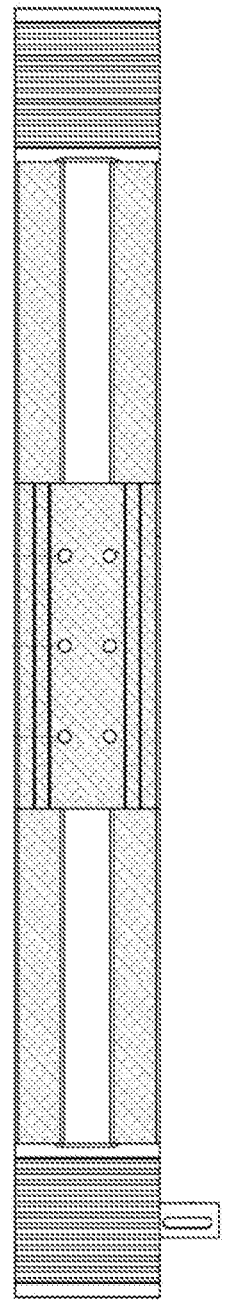

FIGS. 10 and 11 illustrate the motor 130 for raising and lowering, in response to commands from the controller 302, the movable awnings 118 and 120 through the fixed rail 128. In one implementation, a linear-module lifting motor with timing belt OBC 8080 was used.

Figure 12:
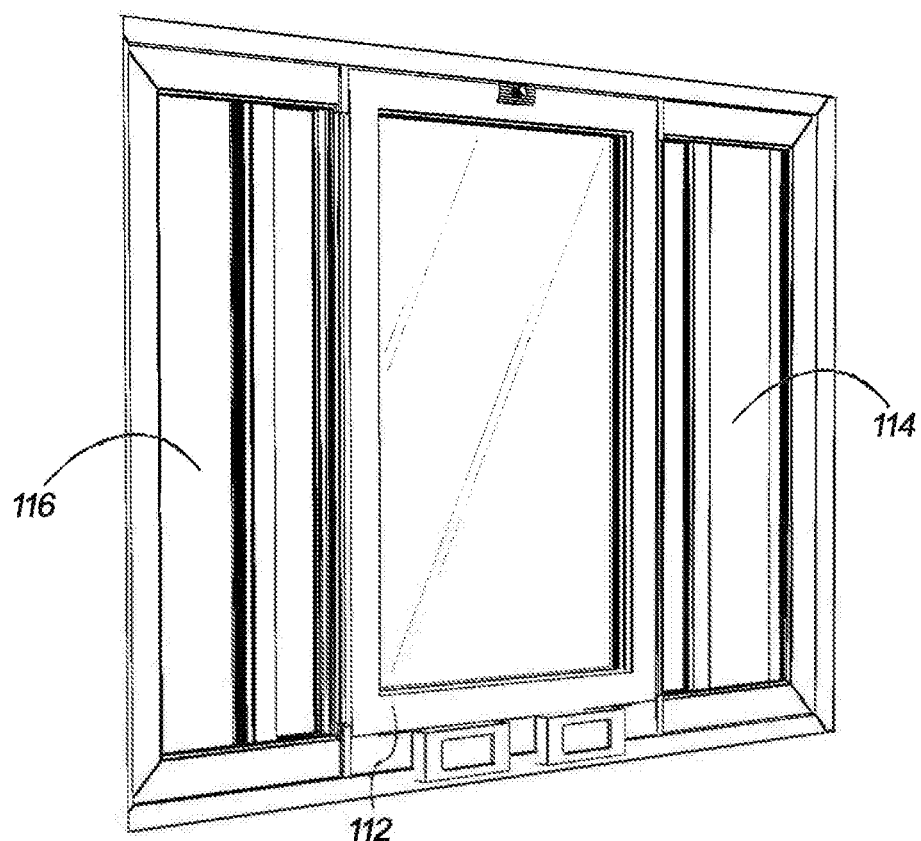
FIG. 12 illustrates outside view of the window in closed position without awnings.

FIG. 12 illustrates another implementation of the adaptive ventilation window without an awning and photovoltaic module that may be used for the structures where there is no sunlight.

Figure 13:
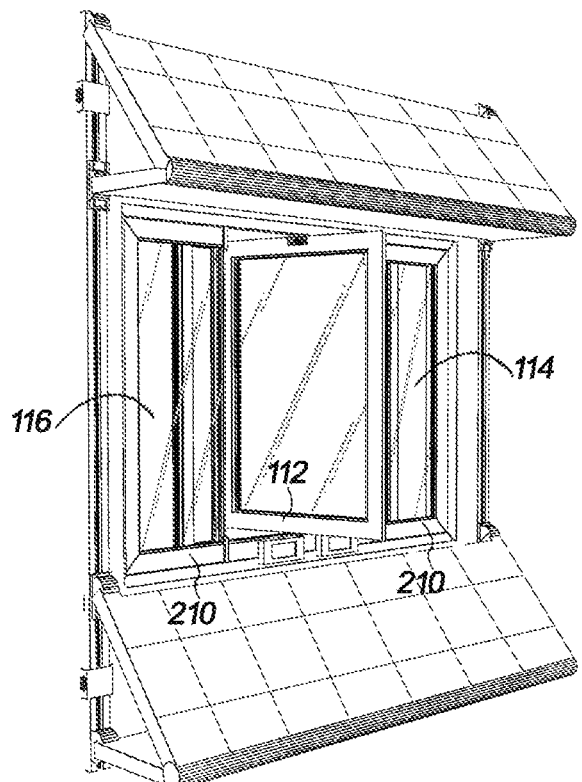
FIG. 13 illustrates front view of the window with side panels in closed positions and central framed panel in open position.
Figure 14:
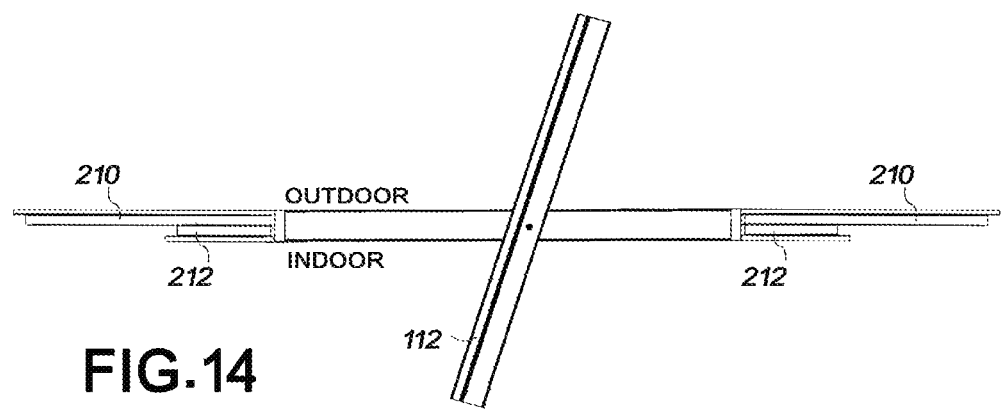
FIG. 14 illustrates outside upper view of the window, with side panels in closed positions and central framed panel in open position.

FIGS. 13 and 14 illustrate another implementation where the central panel 112 is moving to an open position while the side pivoting panels 114 and 116 are in closed positions.

In one implementation, based to the dimensions of the structure to be ventilated, the dimension of the adaptive ventilation window can be changed. In another implementation, based to the dimensions of the structure to be ventilated, the adaptive ventilation window may include one or more window frames. In another implementation, based to the dimensions of the structure to be ventilated, the dimension of the adaptive ventilation window components can be changed. Larger side panels can enhance the ventilation process. Dimensions of the side panels may vary. For example, utilizing larger panels can enhance the ventilation process and can improve the flow distribution in the structure to be ventilated.

Figure 15:
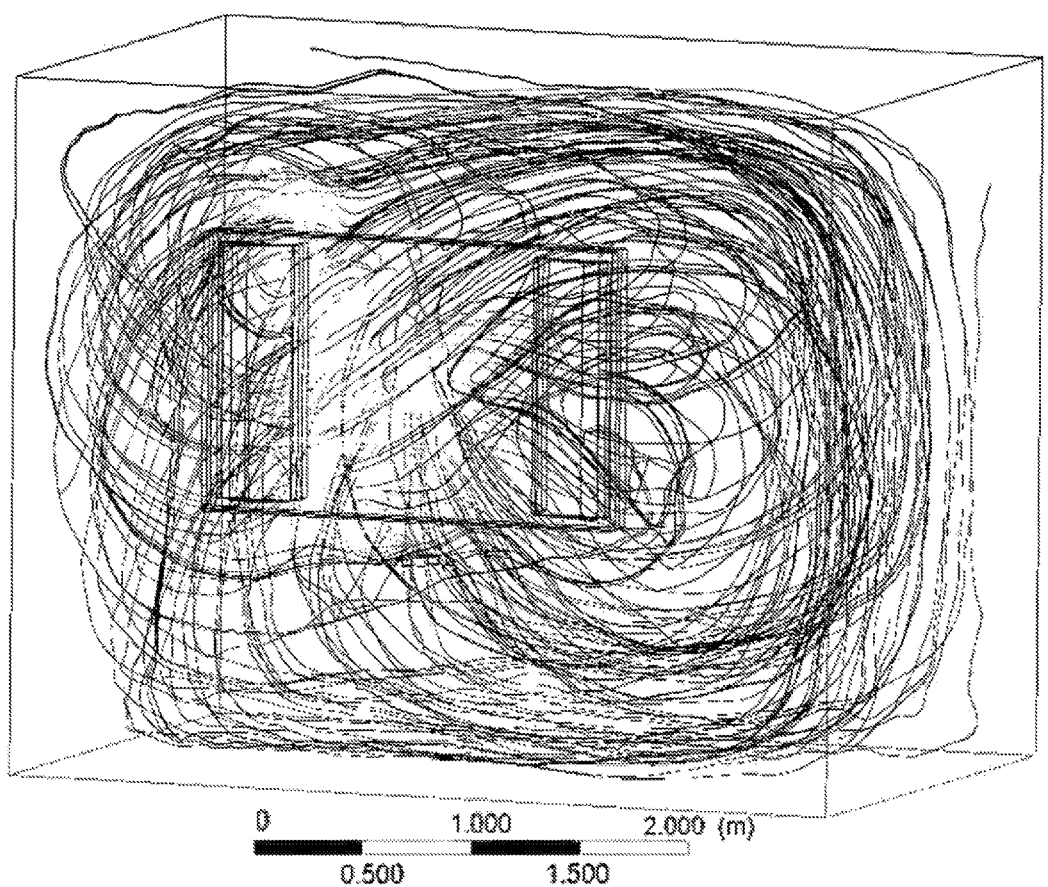
FIG. 15 illustrates contour of the velocity of the air versus the angles of the pivotally coupled frames.

FIG. 15 and FIG. 16 illustrate the simulated performance of the present implementation for restrict opening positions and restrict wind conditions. In one implementation, an example length of the window frame 110 can be 2 m and the height can be 1 m. An example of the side pivoting panels 114 and 116 can be 40 cm long, the outer frames 210 length can be 40 cm and the inner frames 212 can be equal to 20 cm. The area of the example structure is 12 m² (3 m*4 m), and structure height is 3 m and it was assumed the air only flows through the window into or out of the room. A Computational Fluid Dynamics (CFD) software was used for simulation. A k-ε turbulence model was used which is a commonly used method to simulate fluid flow near the wall. Steady state flow conditions were considered. For simplicity and, incompressible flow was assumed. Results for several different modes, shown in FIG. 16 and is the flow contour is drawn in FIG. 15. The results show different flow rate for natural ventilation can be achieved by the present implementation, which reduces the energy consumption and dissipation in the structure to be ventilated, especially residential buildings.

In the case that the outside air flows at or near 90 degrees to the window frame, the present application still will perform better than the commercial windows due to pivotally coupled frames 210 and 212 on the side panels. The controller enhances the ventilation process by changing the angle of the outer frames 210 of the side panels 114 and 116 to increase the air flow rate. For example, by changing the first outer frame 210 from 15 degrees to 60 degrees, the ventilation rate increases from 0.001 kg/s to 0.006 kg/s while the air velocity is 1 m/s and the second outer frame 210 is at angle of 20 degrees, as shown in FIG. 16, No. 7. The results for different angle of the outer frames 210 of first and second side panels 114 and 116, as shown in FIG. 16, show the effect of the angles of the outer frames 210.

Along with the amount of input and output air to the structure, distribution of air inside the structure is also crucial. For example, in FIG. 15, for item number 2 of FIG. 16, the air flow streamlines inside the room are drawn. The results show that the incoming air from the first side panel 114, circulates the entire structure to be ventilated with a proper velocity and exits the structure through the second side panel 116, which facilitates ventilation process. The air changes direction upon contacting with the outer frames 210 on the first side panel 114, and the inner frames 212 on both side panels 114 and 116 impede the early exit of the air and enhances circulation inside the structure to be ventilated and the circulated air exits the ventilated structure through the second side panel 116.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. An adaptive ventilating window apparatus, comprising:
   a window frame, configured for installation in a through opening in an exterior wall of a building;
   a window, including a center panel and side pivoting panel supported by the window frame, the side pivoting panel movable between an open position and a closed position, comprising an inner frame and an outer frame movably coupled by a hinge, wherein the inner frame faces an interior space of the building;
   a first actuator, coupled to a controller and to the side pivoting panel,
   a movable awning, movable between an awning open position and an awning closed position, the awning closed position at least partially covering the window;

a second actuator, coupled to the movable awning and to the controller; and a plurality of sensors, configured to measure an inside environmental condition in the interior space of the building, and an outside environmental condition, wherein:

the controller is coupled to a source power, the sensors, the first actuator, and the second actuator, and based at least in part on the measurement of the inside environmental condition, the outside environmental condition or both, the controller is configured to control the first actuator to rotate the side pivoting panel, or the second actuator to urge the movable awning to a position between the awning open position and the awning closed position, or both.

2. The adaptive ventilating window apparatus of claim 1, wherein the first actuator is further configured to urge, in response to the controller, hinged movement of the inner frame independent from movement of the outer frame.

3. The adaptive ventilating window apparatus of claim 2, wherein the first actuator is further configured to urge, in response to the controller, the outer frame from a closed position to an open position, and concurrently, urge the inner frame to a position approximately 90 degrees to the window frame.

4. The adaptive ventilating window apparatus of claim 2, wherein the first actuator is further configured to urge, in response to the controller, the outer frame from an open position to the closed position and, concurrently, urge the inner frame to a position folded against and parallel to the outer frame.

5. The adaptive ventilating window apparatus of claim 2, wherein the first actuator is further configured to urge, in response to the controller, the inner frame to a position at which an angle of the inner frame relative to the window frame is other than 90 degrees, concurrent with the outer frame being in the open position.

6. The adaptive ventilating window apparatus of claim 1, wherein the side pivoting panel is a first side pivoting panel, the inner frame is a first inner frame, the outer frame is a first outer frame, and the hinge is a first hinge, wherein the adaptive ventilating window apparatus further comprises:

a second side pivoting panel, the second side pivoting panel being movable between an open position and a closed position, and including a second inner frame and a second outer frame movably coupled by a second hinge, wherein the second inner frame faces an interior space of the building, and a third actuator, coupled to the controller and configured to urge the second side pivoting panel in response to the controller, wherein the first actuator is further configured to urge hinged movement of the first inner frame, in response to the controller, independent from movement of the first outer frame, and wherein the third actuator is further configured to urge hinged movement of the second inner frame, in response to the controller, independent from movement of the second outer frame.

7. The adaptive ventilating window apparatus of claim 6, wherein the first actuator is further configured to urge, in response to the controller, the first outer frame from an open position to the closed position and, concurrently, urge the first inner frame to a position folded against and parallel to the first outer frame, and wherein the third actuator is further configured to urge, concurrent with the first outer frame being in the closed position and first inner frame folded against and parallel to the first outer frame, in response to controller, the second outer frame from a closed position to an open position, and concurrently, urge the second inner frame to a position between 0 and 90 degrees to the window frame.

8. The adaptive ventilating window apparatus of claim 6, wherein the first actuator is further configured to urge, in response to the controller, the first outer frame from an open position to the closed position and, concurrently, urge the first inner frame to a position folded against and parallel to the first outer frame, and wherein the third actuator is further configured to urge the second outer frame, in response to the controller, concurrent with urging the first outer frame from the open position to the closed position and the first inner frame to the position folded against and parallel to the first outer frame, from an open position to the closed position and, concurrently, urge the second inner frame to a position folded against and parallel to the second outer frame.

9. The adaptive ventilating window apparatus of claim 6, wherein the first actuator is further configured to urge, in response to the controller, the first outer frame from a closed position to an open position and, concurrently, urge the first inner frame to a position between 0 and 90 degrees to the window frame, and wherein the third actuator is further configured to urge, concurrent with the first outer frame being in the open position and first inner frame in a position between 0 and 90 degrees to the window frame, in response to controller, the second outer frame from a closed position to an open position, and concurrently, urge the second inner frame to a position between 0 and 90 degrees to the window frame.

10. The adaptive ventilating window apparatus of claim 6, wherein the inner frames are configured to impede an early exit of air and enhances circulation inside the building to be ventilated.

11. The adaptive ventilating window apparatus of claim 6, wherein the outer frame is configured to adjust an air flow enter and exit from the building.

12. The adaptive ventilating window apparatus of claim 1 further comprising:

an ultra-violet (UV) index sensor, coupled to the controller, and configured to measure a UV index exterior to the building, wherein the controller is further configured to compare the UV index measurement to a UV threshold and, upon the UV index measurement exceeding the UV threshold, to control the second actuator to urge the movable awning from an open position to the closed position.

13. The adaptive ventilating window apparatus of claim 1, further comprising:

a power storage; and a photovoltaic (PV) power converter having a PV panel supported by the movable awning, wherein the PV power converter is configured to receive and convert a solar energy to a charging current and to provide the charging current to the power storage, wherein the power storage provides at least a portion of the source power.

14. The adaptive ventilating window apparatus of claim 1, wherein the movable awning comprises:

an upper movable awning, movable between an upper movable awning fully retracted position and an upper movable awning fully extended position, a lower movable awning, movable between a lower movable awning fully retracted position and a lower movable awning fully extended position, wherein the awning closed position includes the upper movable awning being in the upper movable awning fully extended position concurrent with the lower movable awning being in the lower movable awning fully extended position.

15. The adaptive ventilating window apparatus of claim 1, wherein the center panel is a pivoting center panel, configured to rotate between a center panel open position and a center panel closed position.

16. The adaptive ventilating window apparatus of claim 1, wherein the controller is configured to operate remotely via wireless communication, or through a keypad installed on the controller.

17. The adaptive ventilating window apparatus of claim 1, wherein the controller can be turned off and the adaptive ventilating window panel and its components can operate manually.

18. The adaptive ventilating window apparatus of claim 1, wherein the plurality of sensors is configured to measure an inside temperature and an outside temperature, and wherein the controller is further configured to control the side pivoting panel based, at least in part, on comparing the inside temperature with a predetermined threshold.

19. The adaptive ventilating window apparatus of claim 1, wherein a sensor is configured to determine wind speed and direction outside the building, and wherein the controller is further configured to control the side pivoting panel based, at least in part, on considering wind speed and direction outside the building.

* * * * *